United States Patent
Yoo et al.

(10) Patent No.: US 7,173,684 B2
(45) Date of Patent: Feb. 6, 2007

(54) LIQUID CRYSTAL DISPLAY DEVICE HAVING MORE UNIFORM SEAL HEIGHTS AND ITS FABRICATING METHOD

(75) Inventors: Soon Sung Yoo, Kumi-shi (KR); Dong Yeung Kwak, Taegu-shi (KR); Yu Ho Jung, Kumi-shi (KR); Yong Wan Kim, Kumi-shi (KR); Woo Chae Lee, Kumi-shi (KR); Dug Jin Park, Taegu-shi (KR); Hoo Sung Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 10 days.

(21) Appl. No.: 09/893,970

(22) Filed: Jun. 29, 2001

(65) Prior Publication Data

US 2002/0085161 A1      Jul. 4, 2002

(30) Foreign Application Priority Data

Dec. 29, 2000    (KR) .............................. 2000-85365

(51) Int. Cl.
    *G02F 1/1339* (2006.01)
(52) U.S. Cl. ................ 349/155; 349/190; 349/153; 349/187
(58) Field of Classification Search ................ 349/153, 349/154, 187, 190, 155
    See application file for complete search history.

(56) References Cited

U.S. PATENT DOCUMENTS 5,621,553 A * 4/1997 Nishiguchi et al. ......... 349/153
6,072,556 A * 6/2000 Hirakata et al. ............ 349/153
6,239,854 B1 * 5/2001 Hirakata et al. ............ 349/149
6,239,855 B1 * 5/2001 Nakahara et al. ........... 349/153
6,373,544 B1 * 4/2002 Hirabayashi ................ 349/149

(Continued)

FOREIGN PATENT DOCUMENTS

JP           07020478 A    *   1/1995

(Continued)

OTHER PUBLICATIONS

Machine language translation of JP 07020478 A.*

(Continued)

*Primary Examiner*—Laura M. Schillinger
(74) *Attorney, Agent, or Firm*—McKenna Long & Aldridge LLP

(57) ABSTRACT

A liquid crystal display device, and a fabricating method thereof, that is capable of providing uniform liquid cell gaps. A main seal defines a liquid crystal injection area. A first step coverage-compensating layer is provided between a substrate on which the main seal has been coated and the main seal. A plurality of dummy seals is arranged external to the main seal. A second step coverage-compensating layer having the same thickness as the first step coverage-compensating layer is provided between the substrate on which the dummy seals are arranged and the dummy seals. Accordingly, a main seal and dummy seals having the same thickness produce uniform liquid crystal cell gaps. The liquid crystal display device is beneficially made by a fabrication process employing four or five masks.

16 Claims, 7 Drawing Sheets

U.S. PATENT DOCUMENTS

| | | | |
|---|---|---|---|
| 6,473,148 B1* | 10/2002 | Suh | 349/153 |
| 6,906,772 B2* | 6/2005 | Kim | 349/153 |
| 6,970,227 B2* | 11/2005 | Kida et al. | 349/190 |
| 2002/0085161 A1* | 7/2002 | Yoo et al. | 349/155 |
| 2002/0196393 A1* | 12/2002 | Tashiro et al. | 349/106 |
| 2003/0123016 A1* | 7/2003 | Kim | 349/153 |
| 2004/0001177 A1* | 1/2004 | Byun et al. | 349/187 |
| 2004/0041976 A1* | 3/2004 | Kida et al. | 349/187 |
| 2004/0095548 A1* | 5/2004 | Lim et al. | 349/187 |
| 2005/0122463 A1* | 6/2005 | Byun et al. | 349/187 |
| 2006/0176439 A1* | 8/2006 | Tashiro et al. | 349/190 |

FOREIGN PATENT DOCUMENTS

| | | | |
|---|---|---|---|
| JP | 08278510 A | * | 10/1996 |
| JP | 10123539 A | * | 5/1998 |
| JP | 10301096 A | * | 11/1998 |

OTHER PUBLICATIONS

Machine language translation of JP 10123539 A.*
Machine language translation of JP 10301096 A.*
Machine language translation of 08-278510 A.*

* cited by examiner

US 7,173,684 B2

LIQUID CRYSTAL DISPLAY DEVICE HAVING MORE UNIFORM SEAL HEIGHTS AND ITS FABRICATING METHOD

CROSS REFERENCES TO RELATED APPLICATIONS

This application claims benefit of Korean Patent Application No. P2000-85365, filed on Dec. 29, 2000, the entirety of which is hereby incorporated by reference for all purposes as if fully set forth herein.

BACKGROUND OF THE INVENTION

1. Field of the Invention

This invention relates to a liquid crystal display. More particularly, it relates to a liquid crystal display and to a method of fabricating that display.

2. Description of the Related Art

Generally, an active matrix liquid crystal display (LCD) uses thin film transistors (TFT's) as switching devices. Such displays are capable of producing high quality moving images. Since LCD's can be made relatively small, they have become widely used as displays for personal computers, notebook computer, office automation equipment such as copiers, and portable devices such as cellular phones.

Fabricating an active matrix LCD includes substrate cleaning, substrate patterning, alignment film formation, substrate adhesion, liquid crystal injection, packaging, and testing.

In substrate cleaning, a cleaner removes foreign substances from an upper substrate and from a lower substrate, both before and after patterning.

Substrate patterning involves providing an upper substrate and a lower substrate. The upper substrate has color filters, a common electrode and a black matrix. The lower substrate includes signal conductors, such as data lines and gate lines, and a thin film transistor (TFT) at the intersections of the data lines and the gate lines. The lower substrate also has pixel electrodes at pixel areas between the data lines and the gate lines.

Substrate adhesion and liquid crystal injection involves coating an alignment film on the lower substrate, rubbing the alignment film to provide for liquid crystal alignment, and adhering the upper substrate to the lower substrate using a sealant. A liquid crystal is then injected through an injection hole, which is then sealed. The sealant assists defining a space for the liquid crystal.

A dummy seal has been used to assist substrate adhesion and to provide for a uniform cell gap. This is described in more detail with the assistance of FIG. 1 and FIG. 2. FIG. 1 illustrates a conventional LCD device having a lower substrate 1, an upper substrate 2, and a seal 3 on the lower substrate. Dummy seals 8A to 8D are also provided.

The main seal 3 defines a space for receiving a liquid crystal and for producing a picture display area 5. One side of the main seal includes a liquid crystal injection opening 4. The liquid crystal is injected through the liquid crystal injection opening 4. The dummy seals 8A to 8D are arranged outside the main seal 3. Those dummy seals have the same thickness as the main seal 3.

At the picture display area 5 the lower substrate 1 has data lines that receive video signals, and gate lines that receive scanning signals. The data lines and the gate lines perpendicularly intersect. At each intersection is a TFT that is used for switching a liquid crystal cell. A pixel electrode in the liquid crystal cell connects to the TFT. Further, the lower substrate 1 also includes data pads 6 that connect to the data lines, and gate pads 7 that connect to the gate lines. Those pads are formed outside of the main seal 3. The gate pads 7 apply scanning signals, in the form of gate pulses from a gate driving integrated circuit (IC), to the gate lines via gate links 10. The data pads 6 apply video signals from a data driving IC to the data lines via data links 9. The data pads 6 and the gate pads 7 typically connect to the data driving IC and to the gate driving IC, respectively, by a tape automated bonding (TAB) system that employs a tape carrier package (TCP), or by a chip on glass (COG) system having a circuit that is directly mounted on the substrate.

The upper substrate 2 includes a black matrix, color filters, and a common electrode (not shown). The black matrix is formed at interface areas between the liquid crystal cells so as to reduce optical interference between those cells. The color filters selectively transmit light having specific color bands so as to produce red (R), green (G), and blue (B) colors.

In the conventional LCD panel shown in FIG. 1 although the dummy seals 8A to 8D are provided, the height of the layers formed on the lower substrate 1 vary. Referring now to FIG. 2, this variance is a result of differences in the number and the thicknesses of the layers under the main seal 3 and under the dummy seals 8A to 8D. This produces seal steps.

Along lines A–A', F–F', G–G' and H–H' in FIG. 1, the dummy seals 8A to 8D are formed only on the lower substrate 1. Those seals have a thickness of approximately 6000 Å.

At the gate link area along line B–B' of FIG. 1, the lower substrate 1 has stacked layers each comprised of a gate metal layer 20, a gate-insulating layer 21, an active layer 22 and a passivation layer 23. The stacked layers have a thickness of approximately 10300 Å. Furthermore, an unstacked area exists between the stacked-layers. The main seal 3 is coated over the structures in the gate link area at line B–B'. The result is that the main seal 3 has an uneven top surface, which is higher than the top surface of the dummy seals along lines A–A', F–F', G–G' and H–H' of FIG. 1.

At the data link area 9 along line C–C' of FIG. 1, on the lower substrate 1 are stacked layers, each comprised of a gate-insulating layer 21, an active layer 22, a source/drain metal layer 24 and a passivation layer 23. Those stacked layers have a thickness of approximately 9500 Å. Furthermore, an unstacked area exists between those stacked-layers. The main seal 3 is coated over the structures in the data link area at lines C–C'. The result is that the main seal 3 has an uneven top surface.

At the liquid crystal injection hole area along line D–D' of FIG. 1, on the lower substrate 1 are a gate metal layer 20, a gate-insulating layer 21, a source/drain metal layer 24 and a passivation layer 23. Those layers have a thickness of approximately 10000 Å. The main seal 3 is coated over the structures in the liquid crystal injection hole area at lines D–D'.

At the lower area of the main seal 3 along line E–E' of FIG. 1, on the lower substrate 1 are stacked layers, each comprised of a gate metal layer 20, a gate-insulating layer 21, a source/drain metal layer 24, and a passivation layer 23. Those stacked layers have a thickness of approximately 10000 Å. The main seal 3 is coated over the structures in the liquid crystal injection hole area at lines E–E'.

Accordingly, in the conventional LCD panel illustrated in FIG. 1 and FIG. 2, the stacked-layer thicknesses of the dummy seals 8A to 8D and the main seal 3 vary. Thus, a uniform force is not applied to the substrate after adhesion of the upper substrate 2 to the lower substrate 1. As a result, the spacing between the upper and lower substrates 2 and 1 is non-uniform. This can cause display quality deterioration.

Therefore, a liquid crystal display device, and a method of fabricating that liquid crystal display device, having a uniform cell gap would be beneficial.

SUMMARY OF THE INVENTION

Accordingly, it is an object of the present invention to provide a liquid crystal display device, and its fabricating method, that has a uniform cell gap.

Another object of the present invention is to provide a method of compensating for a cell gap in a liquid crystal display device.

To achieve these and other objects of the invention, a liquid crystal display device according to the principles of the present invention includes a main seal on a substrate and that defines a liquid crystal injection area; a first step coverage-compensating layer between that substrate and the main seal; a plurality of dummy seals arranged on a substrate external to the main seal; and a second step coverage-compensating layer provided between the substrate on which the dummy seals have been coated and the dummy seals. Beneficially, the second step coverage-compensating layer has the same thickness as the first step coverage-compensating layer. Also beneficially, the main seal and the dummy seals have the same thickness, preferably about 6500 Å.

The liquid crystal display device can further include a gate metal pattern that forms a gate line on a substrate and that electrically connects to a gate electrode of a thin film transistor. That gate line can be supplied with a scanning signal. A gate-insulating layer can cover the gate metal pattern.

A method of fabricating a liquid crystal display device according to another aspect of the present invention includes forming a first step coverage-compensating layer having a desired thickness on a substrate; forming a main seal defining a liquid crystal injection area on the first step coverage-compensating layer; forming a second step coverage-compensating layer on the substrate and external to the main seal; and forming a plurality of dummy seals on the second step coverage-compensating layer. Beneficially, the second step coverage-compensating layer has the same thickness as the first step coverage-compensating layer.

The method of fabricating a liquid crystal display device can further include forming a gate metal pattern on the substrate, patterning that gate metal layer into a gate line that electrically connects to a gate electrode of a thin film transistor; forming a gate-insulating layer, an active layer, an ohmic contact layer and a source/drain metal layer on the substrate and over the gate metal pattern; patterning the ohmic contact layer and the source/drain metal layer in such a manner to form a thin film transistor and to be removed from the formation positions of the main seal and the dummy seals; forming a passivation layer so as to cover the source/drain metal layer; forming a photo resist into a uniform thickness on the passivation layer; patterning the photo resist such that the photo resist on the thin film transistor is partially removed and the photo resist is fully removed from the main seal and the dummy seal positions; patterning the passivation layer and the semiconductor layer by utilizing the photo resist pattern as a mask such that the passivation layer and the semiconductor layer is removed from the main seal and the dummy seal positions and such that the passivation layer on the thin film transistor remains and the drain electrode is patterned and the source/drain metal layer is exposed; and forming a pixel electrode that electrically connects, via a contact hole through the passivation layer.

A method of compensating cell gaps of liquid crystal cells in a liquid crystal display device according to another aspect of the present invention includes the steps of forming a first step coverage-compensating layer having a desired thickness on a substrate, forming a main seal defining a liquid crystal injection area on the first step coverage-compensating layer; forming a second step coverage-compensating layer external to the main seal; and disposing dummy seals on the second step coverage-compensating layer so as form main seal and the dummy seals having a uniform height over a substrate.

BRIEF DESCRIPTION OF THE DRAWINGS

These and other objects of the invention will be apparent from the following detailed description of the illustrated embodiments of the present invention, and with reference to the accompanying drawings, in which.

DETAILED DESCRIPTION OF THE PREFERRED EMBODIMENT

Figure 1:
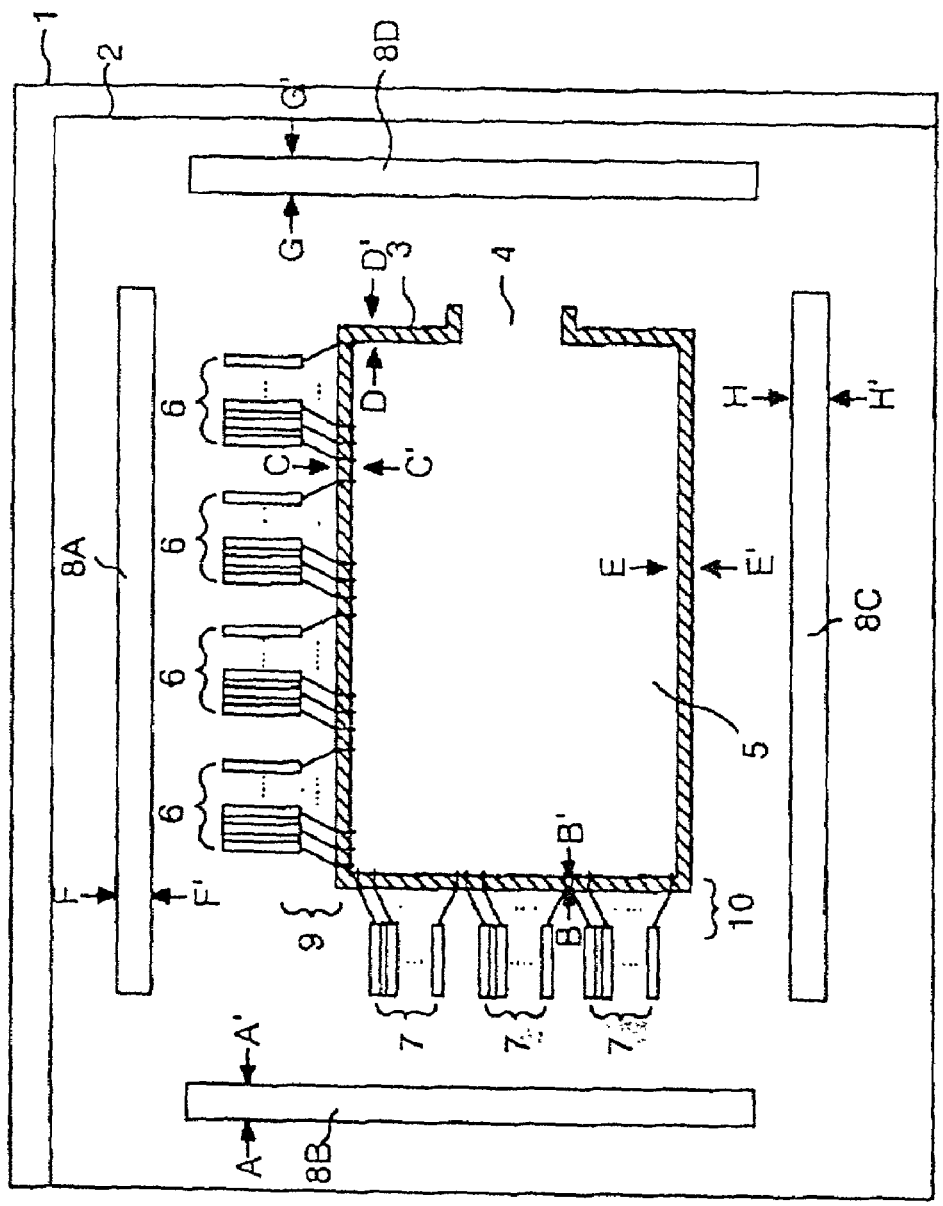
FIG. 1 is a schematic plan view showing a structure of a conventional liquid crystal display device.
Figure 2:
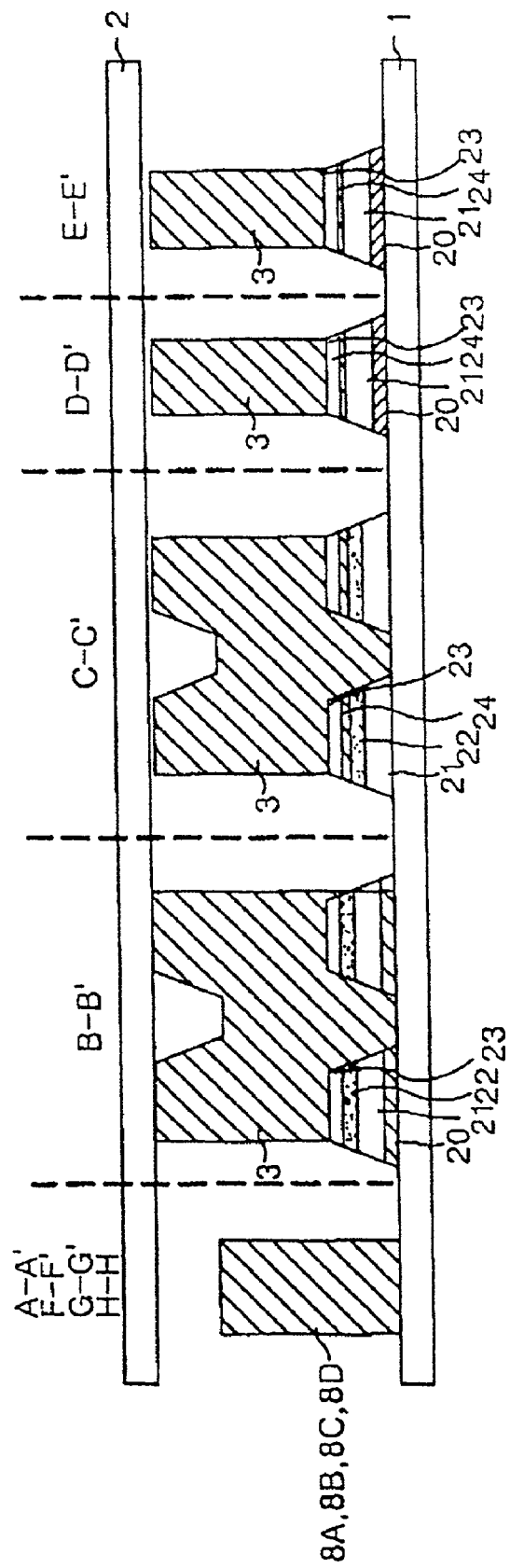
FIG. 2 is a sectional view of the conventional liquid crystal display device shown in FIG. 1, taken along lines A–A', B–B', C–C', D–D', E–E', F–F' and G–G' of FIG. 1.
Figure 3:
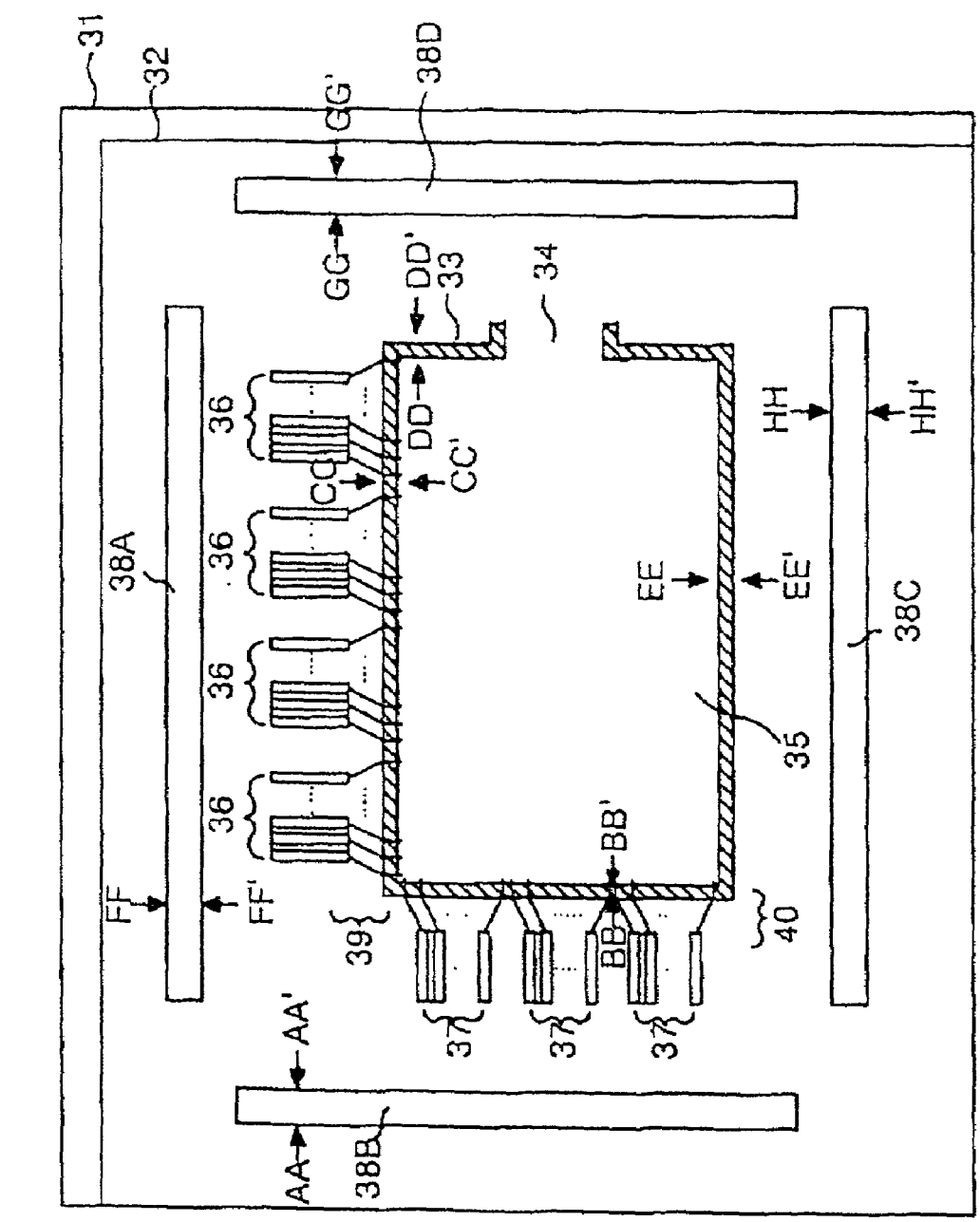
FIG. 3 is a schematic plan view showing a structure of a liquid crystal display device according to the principles of the present invention.

Referring now to FIG. 3, there is shown a liquid crystal display (LCD) device according to the principles of the present invention. That LCD device includes a lower substrate 31 having a main seal 33 and dummy seals 38A to 38D. That LCD device also includes an upper substrate 32 that is attached to the lower substrate 31.

The main seal 33, which forms a liquid crystal space and a picture display area 35, includes a liquid crystal injection hole 34. A liquid crystal is injected into the picture display area 35 through the liquid crystal injection hole 34. The dummy seals 38A to 38D are external to the main seal 33 and are fabricated to have the same thickness as the main seal 33. Under the main seal 33 and the dummy seals 38A to 38D are stacked-layer patterns that have a uniform thickness.

The picture display area 35 includes data lines, to which video signals are applied, and gate lines, to which scanning signals are applied. The data lines and gate lines perpendicularly intersect. At each intersection is a TFT for switching the state of a liquid crystal cell via a pixel electrode that connects to a TFT. On the lower substrate 31 and outside the main seal 33 are data pads 36 that connect to data lines and gate pads 37 that connect to gate lines. The gate pads 37 apply a scanning signal, in the form of gate pulses from a gate driving integrated circuit (IC), to the gate lines via gate links 40. The data pads 36 apply video signals from a data driving IC to the data lines via data links 39. The data pads 36 and the gate pads 37 connect to the data driving IC and to the gate driving IC, respectively, by a tape automated bonding (TAB) system that employees a tape carrier package (TCP) or by a chip on glass (COG) system having a circuit that is directly mounted on the substrate.

The upper substrate 32 is provided with a black matrix, color filters, and a common electrode (which are not shown). The black matrix is formed at interface areas between the liquid crystal cells so as to reduce optical interference between those cells. The color filters selectively transmit light of specific color bands to provide red (R), green (G), and blue (B) images.

Figure 4:
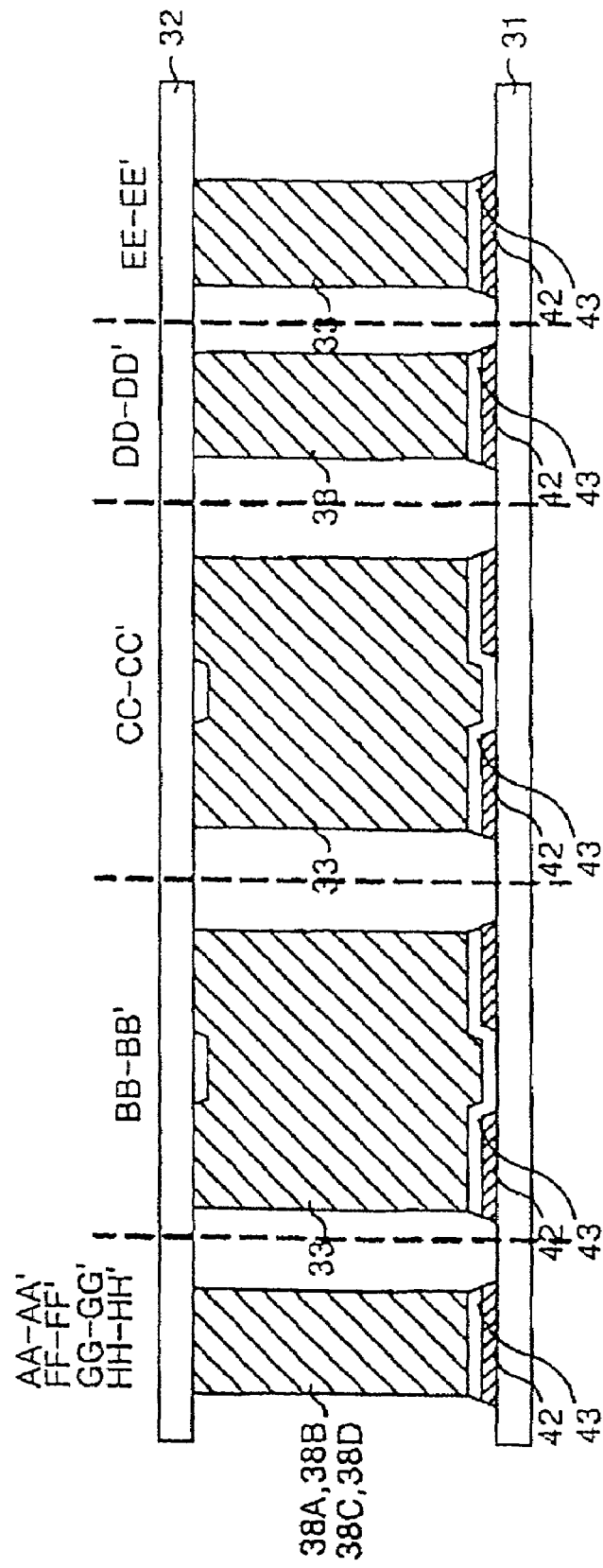
FIG. 4 is a sectional view of the liquid crystal display shown in FIG. 3.

The main seal 33 and the dummy seals 38A to 38D are fabricated with the same thickness. Furthermore, the stacked-layer patterns below those seals have the same thickness. Therefore, as shown in FIG. 4, the main seal 33 and the dummy seals 38A to 38D have the same height. As a result, uniform force is applied to substrates when they are adhered, producing liquid cells having uniform thicknesses.

Referring to FIG. 4, the number and the thicknesses of the stacked-layers under the main seal 33 and the dummy seals 38A to 38D are the same.

At the dummy seal areas along lines AA–AA', FF–FF', GG–GG' and HH–HH' of FIG. 3, is a gate metal layer 42 and a passivation layer 43 that are disposed at a thickness of approximately 6500 Å. The dummy seals 38A to 38D are formed on those structures. Alternately, only a gate metal layer 42, having a thickness of approximately 4000 Å, can be formed at the dummy seal areas 38A to 38D. Then, the dummy seals 38A to 38D can be formed directly on the gate metal layer. In another alternative, a gate-insulating layer (not shown) and a passivation layer 43 are stacked to a thickness of approximately 6000 Å. The dummy seal dummy seals 38A to 38D are then formed directly on the passivation layer.

At the gate link area along line BB–BB' of FIG. 3, is a gate metal layer 42 and a gate-insulating layer 43 that are stacked on the lower substrate 1 to a thickness of approximately 6500 Å. The main seal 33 is then formed on the gate-insulating layer 43.

Likewise, at the data link area 39, at the liquid crystal injection area, and at the lower area of the main seal 33, along lines CC–CC', DD–DD' and EE–EE' of FIG. 3, respectively, are a gate metal layer 42 and a gate-insulating layer 43 that are stacked on the lower substrate 31 to a thickness of approximately 6500 Å. The main seal 33 is formed on the gate-insulating layer 43.

Figure 5A:
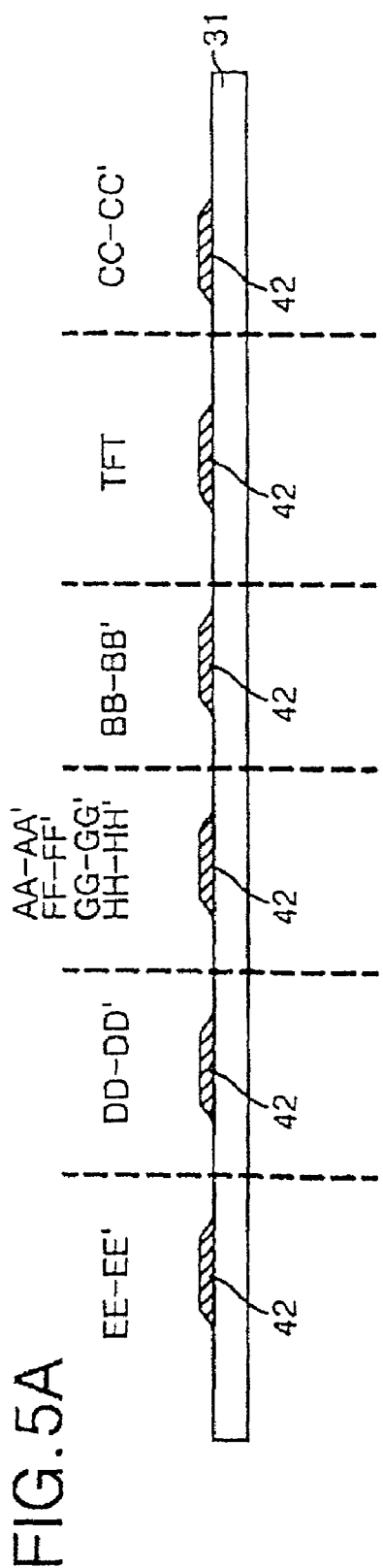
FIG. 5A to FIG. 5F are sectional views that help explain a method of fabricating the liquid crystal display shown in FIG. 3 and FIG. 4.

A lower substrate patterning process according to the principles of the present LCD device beneficially uses four or five masks. FIG. 5A to FIG. 5E illustrate a patterning process that employees four masks. Referring now to FIG. 5A, a gate metal layer is deposited on the lower substrate 31, such as by sputtering or non-electrolytic plating. The lower substrate 31 is beneficially a glass substrate, a quartz substrate, or a transparent plastic substrate. The gate metal is beneficially chrome (Cr), molybdenum (Mo), or an aluminum-series. If the gate metal is an aluminum-series the gate metal is preferably a stacked-layer structure of aluminum-neodymium (AlNd)/molybdenum (Mo). Subsequently, a first mask (not shown) is aligned on the lower substrate 31 and the gate metal layer is patterned by photolithography to form gate lines and TFT gate electrodes.

Figure 5B:
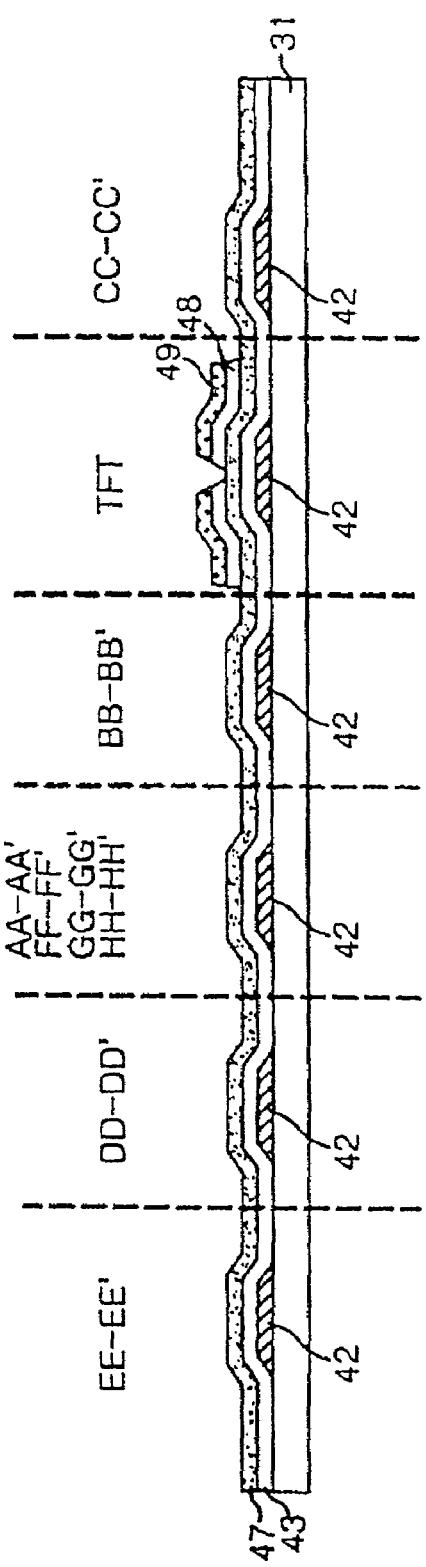

Referring now to FIG. 5B, a gate insulating material, an undoped semiconductor material, and an impurity doped semiconductor material are then deposited on the lower substrate, beneficially by chemical vacuum deposition (CVD). The gate insulating material is beneficially silicon oxide or silicon nitride about 4000 Åthick. The undoped semiconductor material is beneficially amorphous silicon or poly-crystalline silicon. The impurity doped semiconductor material is beneficially amorphous silicon or poly-crystalline silicon that is doped at a high concentration with an n-type or p-type impurity.

A source/drain metal is then deposited over the impurity doped semiconductor material layer, beneficially by CVD or sputtering. The source/drain metal is beneficially selected from a metal such as molybdenum (Mo), titanium (Ti) or tantalum (Ta), or a molybdenum alloy such as MoW, MoTa or MoNb.

A second mask is then aligned on the source/drain metal layer. That layer is then patterned by photolithography using a wet etchant. Furthermore, the source/drain metal layer is removed from the area corresponding to the position of the main seal 33 and the dummy seals 38A to 38D. The patterned source/drain metal layer 49 forms the data line and the source and drain electrodes of the TFT. By utilizing the patterned source/drain metal layer 49 as a mask, the impurity doped semiconductor material is wet etched. As a result, only the gate metal pattern 42, the gate-insulating layer 43 and the active layer 47 remain at the areas corresponding to the main seal 33 and to the dummy seals 38A to 38D. Furthermore, the gate metal pattern 42, the gate-insulating layer 43, and the active layer 47 remain on the TFT area. That TFT area further includes an ohmic contact layer pattern 48 and the source/drain metal pattern 49.

Figure 5C:
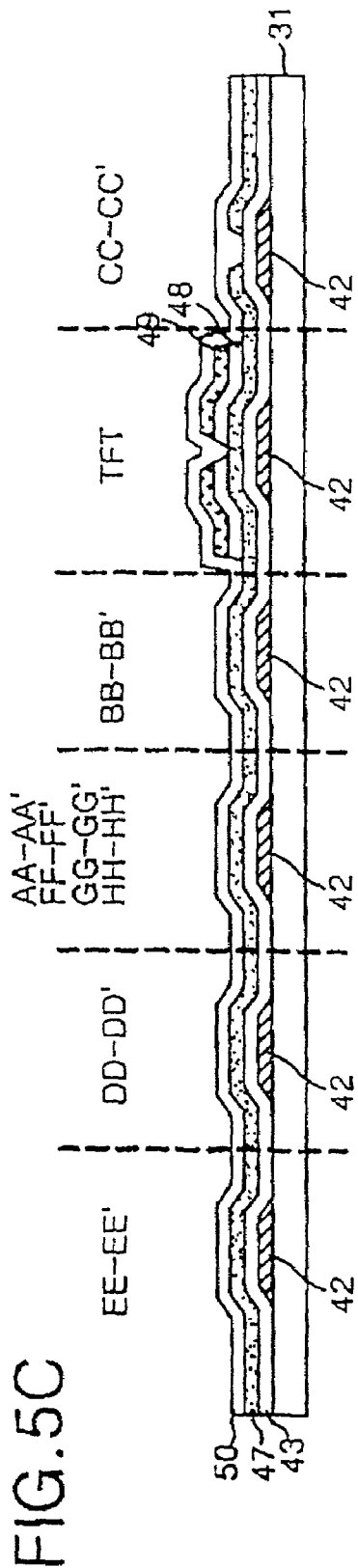

Referring now to FIG. 5C, an inorganic insulating material, such as silicon oxide or silicon nitride, is deposited over the lower substrate 31. This inorganic material layer forms a passivation layer 50. Alternatively, the passivation layer 50 may be formed from an organic insulating material having a small dielectric constant, such as an acrylic organic compound, BCB (benzocyclobutene) or PFCB (perfluorocyclobutane).

Figure 5D:
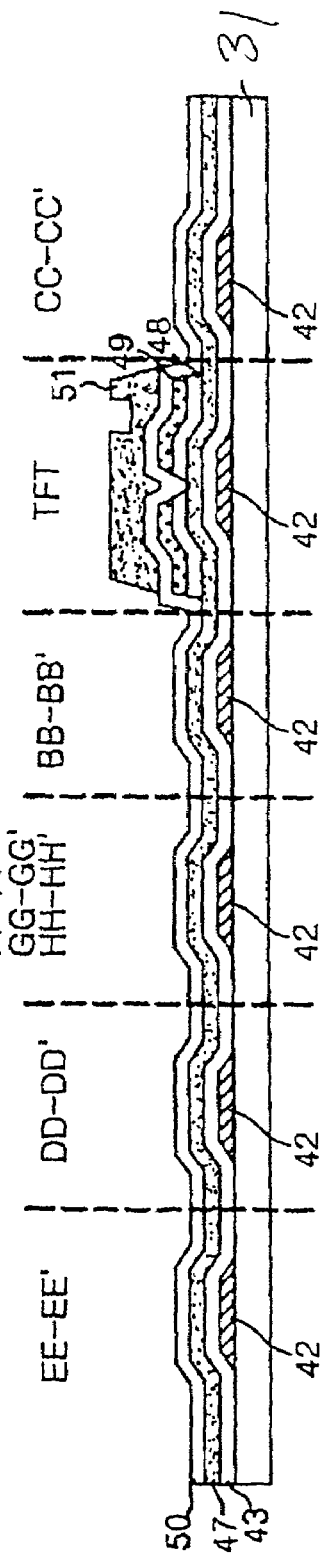

Referring to FIG. 5D, a uniform thickness photo resist is then coated on the passivation layer 50. Subsequently, a third mask is aligned on the photo resist layer. The third mask is a half-tone mask or a diffraction mask that patterns the photo resist layer into different thicknesses. The half-tone mask consists of an opened part for transmitting all of an incident light, a light-shielding part for shutting off all of the incident light, and a semi-shielding part for transmitting a portion of the incident light. The diffraction mask consists of an open part for transmitting all of an incident light, a light-shielding part for shutting off all of an incident light, and a light diffracting part formed by a diffractive pattern having a smaller pitch than a light wavelength to diffract the incident light, thereby transmitting only a portion of the incident light.

With the third mask properly aligned, the photo resist layer is photolithographically patterned by exposure, development, and wet etching. During light-exposure, a differential amount of light is irradiated onto the photo resist layer, depending on the third mask. As a result, the photo resist layer remains on the TFT, on the data line (not shown), and at the data pad contact hole position, whereas the photo resist layer is removed at the positions of the main seal 33 and of the dummy seals 38A to 38D. The photo resist pattern 51 remaining on the TFT has a thickness equal to 10 to 50% of the thickness at the contact hole position of the drain electrode (formed by the source/drain metal pattern 49), while having approximately the initial thickness at the other areas.

Figure 5E:
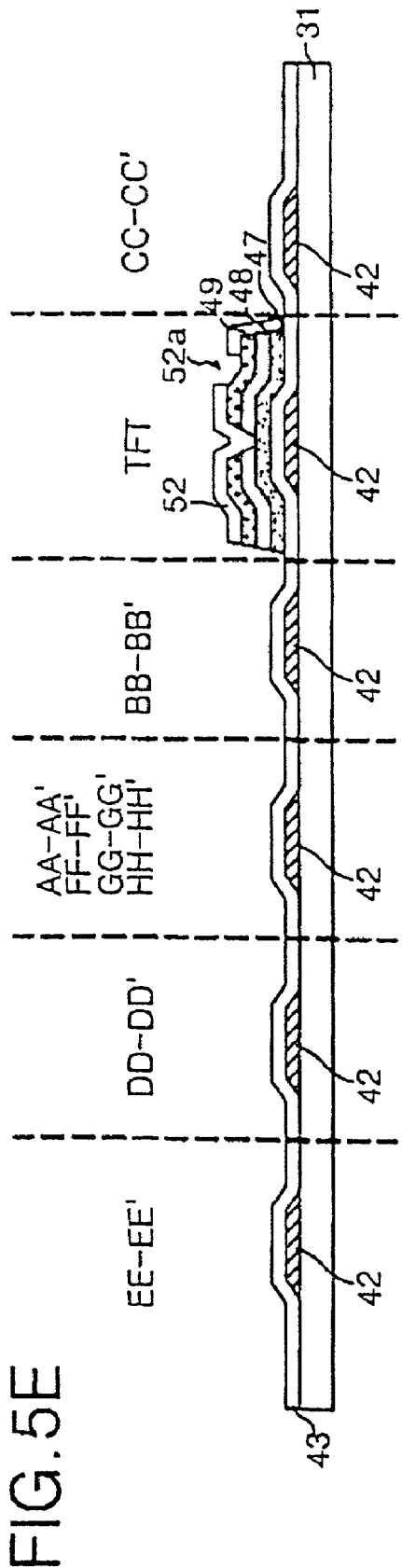

Referring now to FIG. 5E, the passivation layer 50 and the active layer 47 are successively patterned by exposure, development, and wet etching using the photo resist pattern 51 as a mask. The photo resist pattern 51 at the TFT area has a small thickness at the contact hole position and a large thickness adjacent the contact hole position as relatively little light-exposure is applied at the contact hole position while a relatively large light-exposure energy is applied adjacent the contact hole position. As a result, the passivation layer 50 and the active layer 47 are removed from the areas of the main seal 33 and the dummy seals 38A to 38D, which have no photo resist pattern 51, whereas the passivation layer 52 adjacent the contact hole 52a area remains. The drain electrode is then formed using the source/drain metal pattern that is exposed through the contact hole 52a. Residuals photo resist on the lower substrate 31 is then eliminated by stripping using a liquid striper.

Figure 5F:
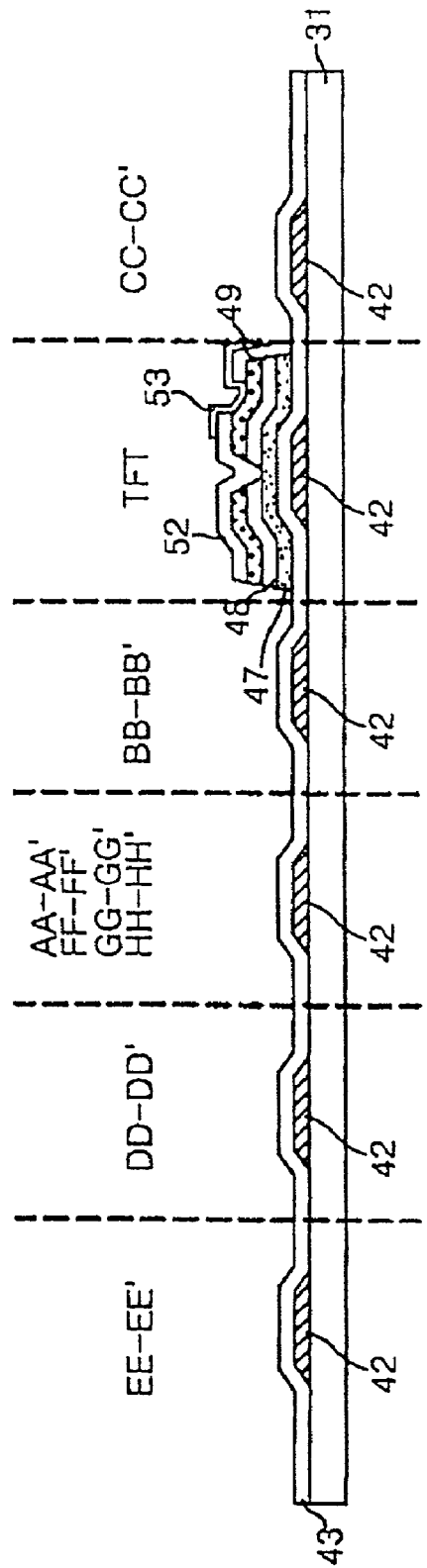

Referring now to FIG. 5F, a transparent conductive material is then deposited over the lower substrate 31. The transparent conductive material can be selected from indium tin oxide (ITO), tin oxide (TO) or indium zinc oxide (IZO). A fourth mask is then aligned on the lower substrate 31. The deposited transparent conductive material is then photolithographically patterned using a wet etchant. A resulting pixel electrode 53 that is comprised of the deposited transparent conductive material is in contact with the drain electrode of the TFT via the contact hole 52a. The transparent conductive material is removed from the areas of the main seal 33 and of the dummy seals 38A to 38D.

Another fabricating process employees five masks. A first mask patterns the gate metal (i.e., the gate electrode and the gate line), a second mask patterns the semiconductor material layer (i.e., the active layer), and a third mask patterns the source/drain metal (i.e., the data line and the source and drain electrodes of the TFT) and the impurity doped semiconductor material layer (i.e., the ohmic contact layer). A fourth mask then patterns the passivation layer, and a fifth mask patterns the transparent conductive material layer to provide the pixel electrode.

As described above, according to the present invention, the number and the thicknesses of the stacked-layers under the main seal and under the dummy seals are made uniform such that a vertical height difference between the main seal and the dummy seals does not exist. As a result, upon adhesion of the upper/lower substrates, a uniform force is applied so as to produce uniform cell gaps of the liquid crystal cells. This reduces image ripples and image stains on the display screen.

Although the present invention has been explained by the embodiments illustrated in the drawings and described above, it should be understood to the ordinary skilled person in the art that the invention relates to will recognize numerous modifications, additions, variations, and alternations. Therefore the present invention is not limited to the illustrated embodiments. Accordingly, the scope of the invention shall be determined only by the appended claims and their equivalents.

What is claimed is:

1. A liquid crystal display device, comprising:
    a first substrate;
    a main seal on the first substrate and defining a liquid crystal injection area;
    a first compensating layer under the main seal, said first compensating layer providing a step upon which the main seal is raised;
    a plurality of dummy seals on the first substrate and external to the liquid crystal injection area; and
    a second compensating layer under the plurality of dummy seals, the second compensating layer providing a step upon which the dummy seals are raised and having substantially a same structure as the first compensating layer.

2. The liquid crystal display device according to claim 1, wherein the main seal is provided with a liquid crystal injection hole through which a liquid crystal can be injected.

3. The liquid crystal display device according to claim 1, wherein the main seal and the dummy seals have a same thickness.

4. The liquid crystal display device according to claim 1, wherein the first compensating layer has a thickness of about 6500 Å.

5. The liquid crystal display device according to claim 1, wherein a top of the main seal and tops of the dummy seals are a same distance from the first substrate.

6. The liquid crystal display device according to claim 1, further comprising:
    a gate metal pattern on the substrate forming a gate line and a gate electrode; and
    a gate-insulating layer covering the gate metal pattern.

7. The liquid crystal display device according to claim 6, wherein the first and second compensating layers include the gate metal pattern and the gate-insulating layer.

8. The liquid crystal display device according to claim 6, wherein the main seal and the dummy seals are formed on the gate-insulating layer.

9. A liquid crystal display device, comprising:
    a first substrate;
    a main seal on the first substrate and defining a liquid crystal injection area;
    a first compensating layer with a width substantially the same as a width of the main seal disposed between the first substrate and the main seal;
    a plurality of dummy seals on the first substrate and external to the liquid crystal injection area; and
    a second compensating layer with a width substantially the same as a width of the dummy seals disposed between the first substrate and the plurality of dummy seals, the second compensating layer having substantially a same structure as the first compensating layer.

10. The liquid crystal display device according to claim 9, wherein the main seal is provided with a liquid crystal injection hole through which a liquid crystal can be injected.

11. The liquid crystal display device according to claim 9, wherein the main seal and the dummy seals have a same thickness.

12. The liquid crystal display device according to claim 9, wherein the first compensating layer has a thickness of about 6500 Å.

13. The liquid crystal display device according to claim 9, wherein a top of the main seal and tops of the dummy seals are a same distance from the first substrate.

14. The liquid crystal display device according to claim 9, further comprising:
    a gate metal pattern on the substrate forming a gate line and an gate electrode; and
    a gate-insulating layer covering the gate metal pattern.

15. The liquid crystal display device according to claim 14, wherein the first and second compensating layers include the gate metal pattern and the gate-insulating layer.

16. The liquid crystal display device according to claim 14, wherein the main seal and the dummy seals are formed on the gate-insulating layer.

* * * * *